(12) United States Patent
Yoo

(10) Patent No.: US 7,746,372 B2
(45) Date of Patent: Jun. 29, 2010

(54) BEAM DEFLECTOR, LIGHT SCANNING UNIT AND IMAGE FORMING APPARATUS HAVING THE SAME

(75) Inventor: Jae-hwan Yoo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/136,960

(22) Filed: Jun. 11, 2008

(65) Prior Publication Data

US 2009/0028603 A1    Jan. 29, 2009

(30) Foreign Application Priority Data

Jul. 6, 2007    (KR) ...................... 10-2007-0068210

(51) Int. Cl.
*B41J 27/00*    (2006.01)
(52) U.S. Cl. ...................................... 347/261
(58) Field of Classification Search ................. 347/231, 347/243, 259–261
See application file for complete search history.

(56) References Cited

U.S. PATENT DOCUMENTS 5,819,149 A * 10/1998 Watanabe et al. ........... 399/330
5,834,870 A * 11/1998 Tokushima et al. ........... 310/90
6,327,067 B2 * 12/2001 Koguchi .................. 359/198.1

* cited by examiner

*Primary Examiner*—Hai C Pham
(74) *Attorney, Agent, or Firm*—Stanzione & Kim, LLP

(57) ABSTRACT

A beam deflector having a base, the beam deflector including a polygon mirror to reflect a light beam, a mirror driving unit including a rotor shaft erected from the base and a rotor to support the polygon mirror and to rotate about the rotor shaft, a friction member to contact with and be separated from the rotor so as to obstruct and release rotation of the rotor, respectively, and a friction member driving unit to drive the friction member.

20 Claims, 7 Drawing Sheets

BEAM DEFLECTOR, LIGHT SCANNING UNIT AND IMAGE FORMING APPARATUS HAVING THE SAME

CROSS-REFERENCE TO RELATED APPLICATIONS

This application claims priority from Korean Patent Application No. 10-2007-0068210, filed on Jul. 6, 2007 in the Korean Intellectual Property Office, the disclosure of which is hereby incorporated herein by reference in its entirety.

BACKGROUND OF THE INVENTION

1. Field of the Invention

The present general inventive concept relates to a beam deflector, a light scanning unit and an image forming apparatus having the same to reduce a driving noise of the image forming apparatus.

2. Description of the Related Art

An electrophotographic image forming apparatus, which representatively includes a copy machine, a laser printer, etc., forms an image on a printing medium with a toner through successive processes of charging, exposing, developing, transferring, fusing and cleaning.

The electrophotographic image forming apparatus includes a light scanning unit performing the exposing process. The light scanning unit includes a light source to generate and scan a beam, a beam deflector to deflect an entering beam so that the beam emitted from the light source can be main-scanned to an exposed body, and an f-θ lens to correct an error included to the deflected beam by the beam deflector. Also, the beam deflector includes a polygon mirror having a plurality of reflecting planes, and a mirror driving motor rotating the polygon mirror.

However, in the conventional beam deflector, an operation of the mirror driving motor is stopped by turning off an electric power applied to the mirror driving motor after a printing work is completed.

However, although the mirror driving motor is turned off, the polygon mirror idly rotates due to a rotation inertia, and a driving noise due to this is transmitted to a user.

Recently, since the mirror driving motor rotates with a high speed to increase a printing speed (page per minute (ppm)), it takes an prolonged time in stopping the mirror driving motor. Accordingly, noises due to the rotation of the mirror driving motor lasts for a long period of time, thereby causing the user an aggravated inconvenience.

SUMMARY OF THE INVENTION

The present general inventive concept provides a beam deflector, a light scanning unit and an image forming apparatus having the same to reduce a driving noise of the image forming apparatus.

Additional aspects and/or utilities of the present general inventive concept will be set forth in part in the description which follows and, in part, will be obvious from the description, or may be learned by practice of the present general inventive concept.

The foregoing and/or other aspects and utilities of the present general inventive concept can be achieved by providing a beam deflector including a base, a polygon mirror to reflect a light beam, a mirror driving unit including a rotor shaft erected from the base, and a rotor to support the polygon mirror and to rotate about the rotor shaft, a friction member to selectively contact and be separated from the rotor to obstruct and release rotation of the rotor, respectively, and a friction member driving unit to drive the friction member.

The beam deflector may further include a control unit to control the friction member driving unit to selectively contact and separate the friction member to and from the rotor if a rotor decelerating signal and a rotor driving signal may be received from an outside control source.

The friction member driving unit may include a lever to support the friction member and to move so that the friction member can contact to and be separated from the rotor, and an electromagnetic unit to drive the lever by means of a magnetic force.

The friction member driving unit may further include an elastic member to elastically bias the lever away from the rotor, wherein the lever may be formed of a metallic material.

The friction member driving unit may further include a hinge pivot erected from the base, wherein the lever rotates about the hinge pivot.

The friction member driving unit may further include a permanent magnet coupled to the lever away from the friction member so as to cooperate with the electromagnetic unit to contact and separate the friction member to and from the rotor by means of magnetic attraction and repulsion.

The friction member driving unit may further include a switching unit to switch an electric power supplied to the electromagnetic unit from an outside power supply to change a polarity of the electromagnetic unit, and wherein the control unit may control the switching unit so that the magnetic attraction and repulsion can be generated in response to the rotor decelerating signal and the rotor driving signal are received.

The foregoing and/or other aspects and utilities of the present general inventive concept can also be achieved by providing a light scanning unit including the above beam deflector.

The foregoing and/or other aspects of the present general inventive concept can also be achieved by providing an image forming apparatus, including a light source, an image forming unit including a photosensitive body to form an image on a printing medium, and a beam deflector including a base, a polygon mirror to reflect a light beam emitted from the light source toward the photosensitive body, a mirror driving unit including a rotor shaft erected from the base and a rotor to support the polygon mirror and to rotate about the rotor shaft, a friction member to selectively contact and be separated from the rotor to obstruct and release rotation of the rotor, respectively, and a friction member driving unit to drive the friction member.

The image forming apparatus may further include a sensor to sense whether a printing operation of the image forming unit is complete, and a control unit to control the friction member driving unit so that the friction member contacts the rotor if the printing operation is complete and separates from the rotor during performance of the printing operation.

The sensor may include a medium discharge sensor to sense whether the printing medium is discharged.

The friction member driving unit may include a lever to support the friction member and to move so that the friction member can contact to and be separated from the rotor, and an electromagnetic unit to drive the lever by means of a magnetic force.

The friction member driving unit may further include an elastic member to elastically bias the lever in a distanced direction from the rotor, wherein the lever may be formed of a metallic material.

The friction member driving unit may further include a hinge pivot erected from the base, wherein the lever may rotate about the hinge pivot.

The friction member driving unit may further include a permanent magnet coupled to the lever away from the friction member so as to cooperate with the electromagnetic unit to contact and separate the friction member to and from the rotor by means of magnetic attraction and repulsion.

The image forming apparatus may further include a power supplying unit to supply an electric power to the electromagnetic unit, wherein the friction member driving unit may further include a switching unit to switch the electric power supplied to the electromagnetic unit to change a polarity of the electromagnetic unit, and wherein the control unit may control the switching unit so that the magnetic attraction and repulsion can be respectively generated based on whether the printing operation is complete.

The foregoing and/or other aspects and utilities of the present general inventive concept can also be achieved by providing an image forming apparatus to perform a printing operation, the image forming apparatus including a light source to emit a light beam, a polygon mirror to reflect the light beam to a photosensitive body, a rotor to rotate the polygon mirror, and a friction member to contact the rotor to obstruct rotation of the rotor when the printing operation is complete, and to separate from the rotor during performance of the printing operation.

The friction member may contact the rotor only after the last medium of a plurality of mediums has been printed thereon.

The friction member may absorb vibrations from the rotor when the friction member contacts the rotor.

The foregoing and/or other aspects and utilities of the present general inventive concept can also be achieved by providing a beam deflector, including a polygon mirror to reflect a light beam, a rotor to rotate the polygon mirror, the rotor having an operating position and a non-operating position, and a friction member to contact the rotor to stop rotation of the rotor when the rotor is switched to the non-operating position.

BRIEF DESCRIPTION OF THE DRAWINGS

These and/or other aspects and utilities of the present general inventive concept will become apparent and more readily appreciated from the following description of the embodiments, taken in conjunction with the accompanying drawings, in which.

DETAILED DESCRIPTION OF THE PREFERRED EMBODIMENTS

Figure 1:
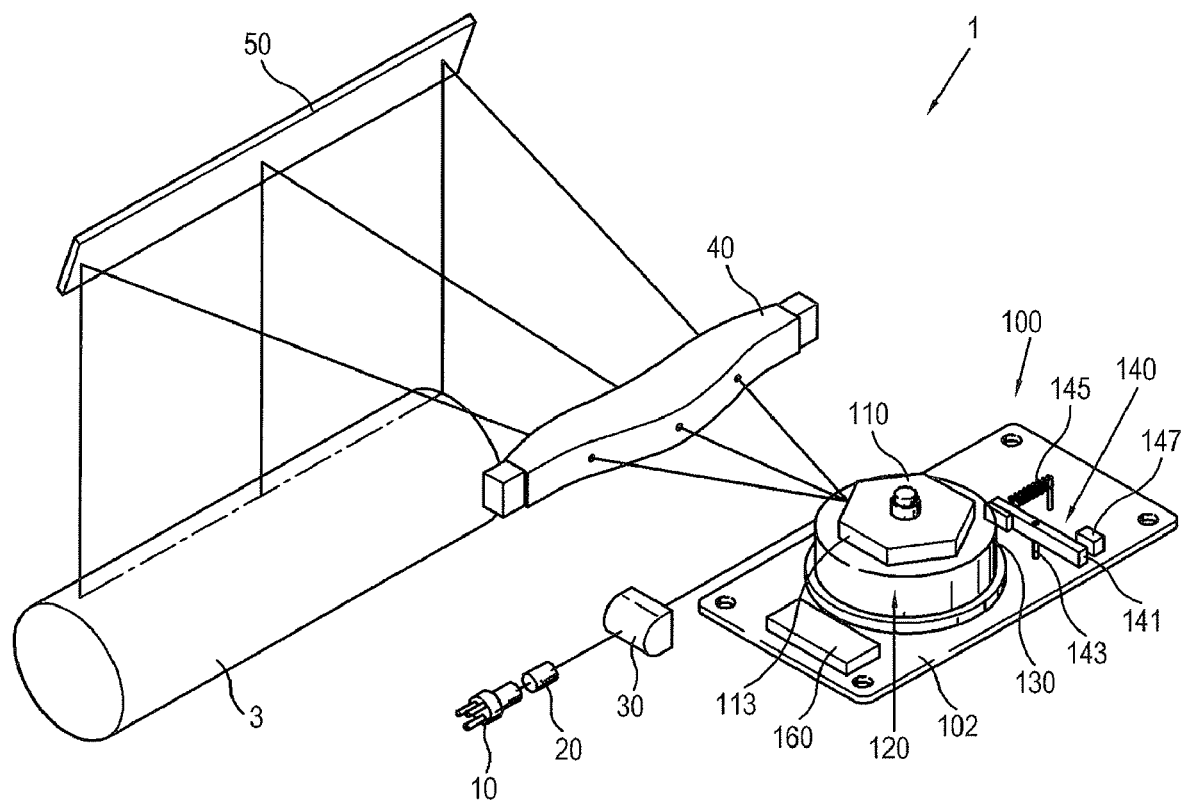
FIG. 1 is a perspective view illustrating a main portion of an image forming apparatus according to an embodiment of the present general inventive concept.

Reference will now be made in detail to the embodiments of the present general inventive concept, examples of which are illustrated in the accompanying drawings, wherein like reference numerals refer to like elements throughout. The embodiments are described below so as to explain the present general inventive concept by referring to the figures.

Figure 2:
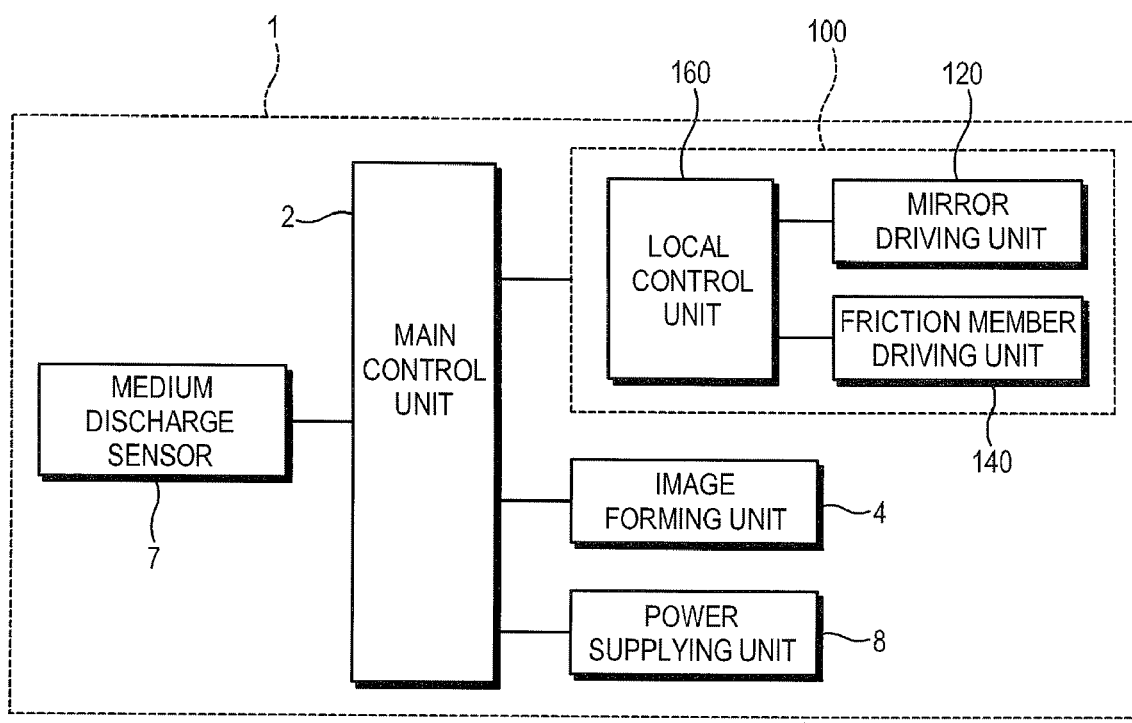
FIG. 2 is a block diagram of the image forming apparatus of FIG. 1.

As illustrated in FIGS. 1 and 2, an image forming apparatus 1 according to an embodiment of the present general inventive concept may include an image forming unit 4, a light source 10 and a beam deflector 100.

The image forming unit 4 may form an image on a printing medium by means of a developer. Also, the image forming unit 4 may include a photosensitive body 3, a developing unit (not illustrated) to develop the photosensitive body 3 with the developer, a transferring unit (not illustrated) to transfer the developed developer from the photosensitive body 3 to the printing medium, and a fusing unit (not illustrated) to fuse the transferred developer on the printing medium by means of heat and pressure.

The developing unit may store the developer therein, and may include a developing roller (not illustrated) to develop the photosensitive body 3, and a supplying roller (not illustrated) to supply the developer stored therein to the developing roller. As necessary, the developing unit may accommodate the photosensitive body 3 to be detachably mounted to the image forming apparatus 1 together with the photosensitive body 3.

The transferring unit and the fusing unit may employ various known configurations.

The light source 10 may be provided in the form of a laser diode or a light emitting diode (LED) to emit a light beam toward a polygon mirror 110 of the beam deflector 100. Other types of light sources may also be used without departing from the principles and spirit of the present general inventive concept.

As illustrated in FIG. 1, the image forming apparatus 1 according to an embodiment of the present general inventive concept may further include a collimating lens 20 to make the light beam emitted from the light source 10 be a parallel light, a cylindrical lens 30 to make the parallel light be a convergent light, an f-θ lens 40 to correct an error of the light beam deflected by the beam deflector 100, and a reflecting mirror 50 to reflect the light beam from the f-θ lens 40 to the photosensitive body 3. Here, an illuminating optical system including the lenses 20, 30 and 40, and the reflecting mirror 50 may have various other known configurations.

As illustrated in FIG. 1, the beam deflector 100 may include a polygon mirror 110, a mirror driving unit 120, a friction member 130 and a friction member driving unit 140.

The polygon mirror 110 may be provided as a polygonal mirror having a plurality of reflecting planes 113. The reflecting planes 113 have six planes as illustrated in FIG. 1, although it is understood that the reflecting planes 113 may alternatively have other numbers of planes without departing from the principles and spirit of the present general inventive concept.

Figure 3:
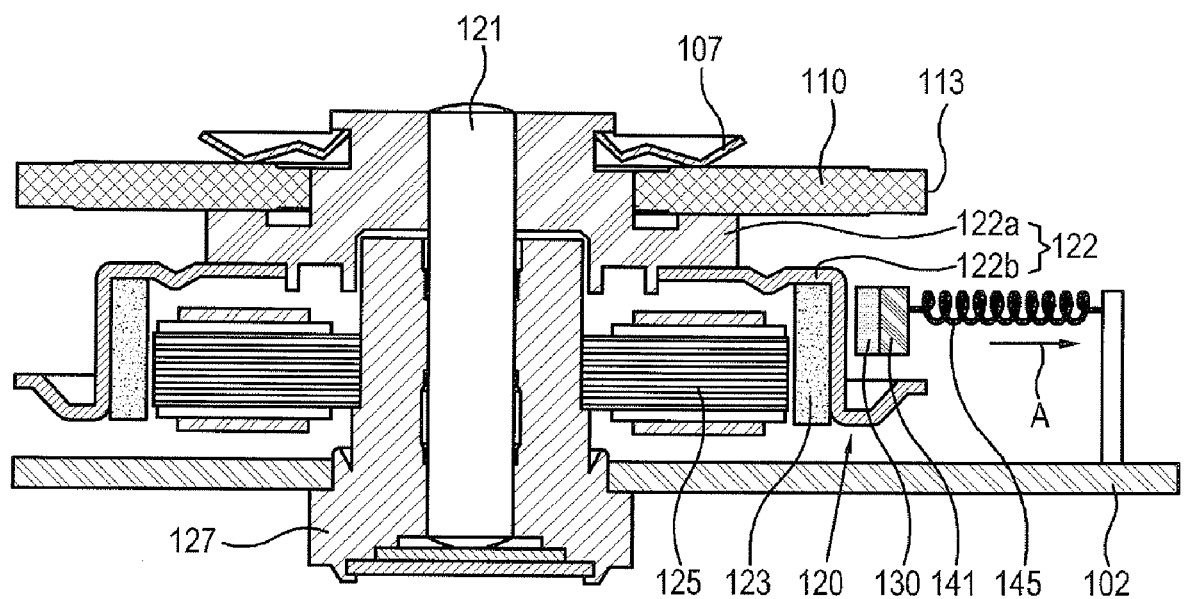
FIG. 3 is a schematic sectional view of the beam deflector of FIG. 1.

As illustrated in FIGS. 1 and 3, the mirror driving unit 120 may rotate the polygon mirror 110, and may be provided as a brushless direct current (bldc) motor.

As illustrated in FIG. 3, the mirror driving unit 120 may include a rotor shaft 121 disposed to be generally vertical to a base 102, a rotor 122 to rotate about the rotor shaft 121, a permanent magnet 123 attached to an inner surface of the rotor 122, and a stator 125 wound with a coil to rotate the rotor 122 by means of an electromagnetic force with the permanent magnet 123. Also, the rotor shaft 121 may be rotatably supported by a shaft bushing 127 disposed to the base 102.

The rotor 122 may include a rotor upper part 122a inserted to an upper part of the rotor shaft 121 to support the polygon mirror 110, and a rotor lower part 122b including an inner surface to which the permanent magnet 123 may be disposed. As necessary, the rotor upper part 122a and the rotor lower part 122b may be integrally formed of the same material. Also, a pressing member 107 may be disposed to elastically press the polygon mirror 110 toward the rotor upper part 122a to minimize vibration of the polygon mirror 110.

The friction member 130 may be selectively moved to contact with, and be separated from, the rotor 122. When contacting the rotor 122, the friction member 130 may apply a friction force to the rotor 122 to obstruct rotation of the rotor 122. On the other hand, when the friction member 130 is separated from the rotor 122, the friction member 130 has no effect on the rotation of the rotor 122. As illustrated in FIG. 3, the friction member 130 may contact an outer surface of the rotor lower part 122b, thereby minimizing interference with circumferential components. Also, since a maximum portion of the rotation inertia is located near the rotor lower part 122b to which the permanent magnet 123 may be attached, the rotor 122 can be stopped within a relatively short period of time by directly applying the friction force to the rotor lower part 122b.

Also, the friction member 130 may be formed of material which is capable of being elastically transformed to absorb the vibration of the rotor 122 when the friction member contacts the rotor 122. For example, the friction member 130 may be formed of material such as sponge, rubber or the like.

The friction member driving unit 140 may drive the friction member 130 so that the friction member 130 can be selectively moved in contact with, and be separated from, the outer surface of the rotor 122.

Figure 4:
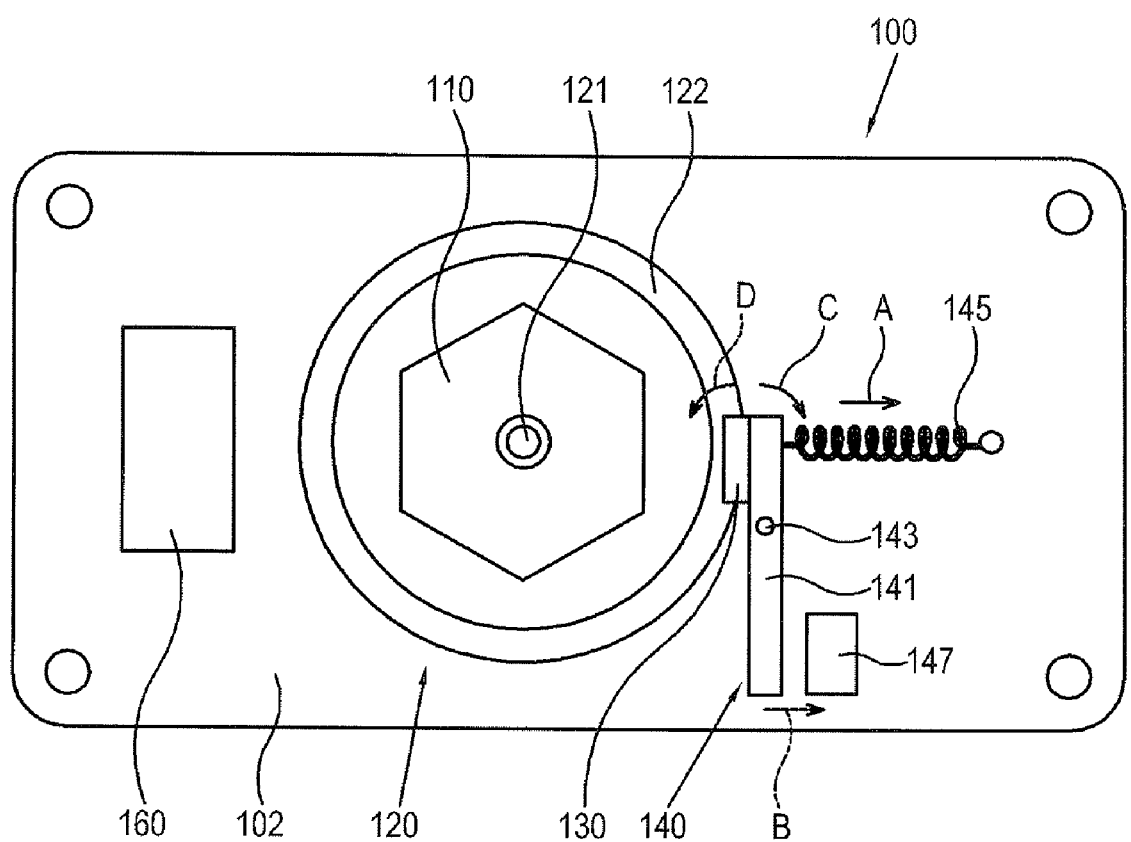
FIG. 4 is a schematic plane view of the beam deflector of FIG. 1.

As illustrated in FIGS. 3 and 4, the friction member driving unit 140 may include a lever 141 to support the friction member 130 and to rotate about a hinge pivot 143 in clockwise and counterclockwise directions, an elastic member 145 to elastically bias the lever 141 in a distanced direction A from the rotor 122, and an electromagnetic unit 147.

The elastic member 145 may apply an elastic force to the lever 141 in the direction A to rotate the lever 141 in a clockwise direction C when a magnetic force B by means of the electromagnetic unit 147 is not generated. Accordingly, the friction member 130 can be separated from the rotor 122.

The electromagnetic unit 147 may be disposed proximate a first side of the lever 141 which may be opposite to a second side of the lever 141 to which the friction member 130 may be coupled with respect to the hinge pivot 143. Also, if an electric power is supplied to the electromagnetic unit 147 by means of a local control unit 160, the lever 141 may rotate in a counterclockwise direction D by means of the magnetic force B generated by the electromagnetic unit 147 so that the friction member 130 can contact the rotor 122. Here, the lever 141 may be formed of a metallic material to be driven by means of the magnetic force B. As necessary, a part of the lever 141 facing the electromagnetic unit 147 may be formed of the metallic material.

Here, since the lever 141 may be capable of rotating in the counterclockwise direction D when a counterclockwise direction D rotation moment by means of the magnetic force B of the electromagnetic unit 147 is bigger than a clockwise direction C rotation moment by means of the elastic member 145, the modulus of elasticity of the elastic member 145, a winding number of a coil of the electromagnetic unit 147, the intensity of current flowing through the coil, etc. may be determined appropriately.

Also, since power consumption may increase as the magnetic force B increases, it may be desirable, but not necessary, to rotate the lever 141 in the counterclockwise direction D with a relatively small magnetic force B. For this, the hinge pivot 143 may be disposed as adjacent as possible to a part to which the friction member 130 is disposed so that a moment arm of the magnetic force B can be longer than that of the elastic force A.

As illustrated in FIGS. 1, 2 and 4, the beam deflector 100 according to an embodiment of the present general inventive concept may further include a local control unit 160.

The local control unit 160 may be provided as a semiconductor integrated circuit including a plurality of circuits to drive and control the mirror driving unit 120. Also, the local control unit 160 may drive the electromagnetic unit 147 of the friction member driving unit 140. The local control unit 160 may turn on and off the electric power supplied to the electromagnetic unit 147 to drive the electromagnetic unit 147.

Also, the local control unit 160 may receive a rotor driving signal and a rotor decelerating signal from an outside control source. In case of receiving the rotor driving signal, the local control unit 160 may block the electric power being supplied to the electromagnetic unit 147 so that the friction member 130 can be separated from the rotor 122 of the mirror driving unit 120. Also, the local control unit 160 may drive and control the mirror driving unit 120 to rotate the polygon mirror 110. Accordingly, the light beam being emitted from the light source 10 can be deflected by the polygon mirror 110 so that a surface of the photosensitive body 3 can be exposed by the light beam.

In case of receiving the rotor decelerating signal, the local control unit 160 may allow the electric power to be supplied to the electromagnetic unit 147 so that the friction member 130 can contact the rotor 122. Accordingly, the rotor 122 can stop within a rapid time due to the friction force applied by the friction member 130. Also, when contacting the rotor 122, the friction member 130 may be elastically transformed to absorb the vibration of the rotor 122 and the polygon mirror 110. Accordingly, noises caused by the rotor 122 rotating due to the rotation inertia can be removed although the local control unit 160 controls the mirror driving unit 120 to stop the rotor 122.

As illustrated in FIG. 2, the image forming apparatus 1 according to an embodiment of the present general inventive concept may further include a medium discharge sensor 7 to sense whether or not a printing medium is discharged to the outside of the image forming apparatus 1, a power supplying unit 8 to supply an electric power to the image forming unit 4 and the beam deflector 160, and a main control unit 2.

The medium discharge sensor 7 may be provided to sense whether or not the printing medium passes through the fusing unit (not illustrated). To this end, it may be determined that the printing medium passes through the fusing unit when an image by means of the developer is completely formed on the printing medium.

The medium discharge sensor 7 may be disposed to a lower course of the fusing unit with respect to a proceeding direction of the printing medium to sense whether the printing medium passes through the fusing unit or not. In detail, the medium discharge sensor 7 may be provided as a photo sensor disposed to the lower course of the fusing unit, and may include a light emitting unit and a light receiving unit interposing the printing medium therebetween to emit a light and to receive the emitted light.

The main control unit 2 may control a total image forming process of the image forming apparatus 1. If the medium discharge sensor 7 senses that the printing medium is discharged to the outside, the main control unit 2 may transmit the rotor decelerating signal to the local control unit 160 of the beam deflector 100. Accordingly, the local control unit 160 can control the friction member driving unit 140 to contact the friction member 130 to the rotor 122, thereby removing the noises due to rotation of the rotor 122. Also, in case of being inputted to form the image on a plurality of printing mediums, the main control unit 2 may transmit the rotor decelerating signal to the beam deflector 100 if the last printing medium is sensed to be discharged. Since the polygon mirror 110 needs time to rotate again with an appropriate speed after being stopped by the friction member 130, it may be an aspect of the present general inventive concept, but not a necessary aspect, to maintain the polygon mirror 110 in a rotating state until a printing work is completely accomplished.

In receiving a printing order from a user, the main control unit 2 may transmit the rotor driving signal to the local control unit 160 of the beam deflector 100. Accordingly, the local control unit 160 can control the friction member driving unit 140 to separate the friction member 130 from the rotor 122, thereby normally rotating the polygon mirror 110. Also, while the image is printed on the printing medium, the main control unit 2 may control the friction member 130 to be separated from the rotor 122, thereby preventing the rotation of the polygon mirror 110 from being interfered therewith.

As necessary, the main control unit 2 may perform a function of the local control unit 160.

Figure 5:
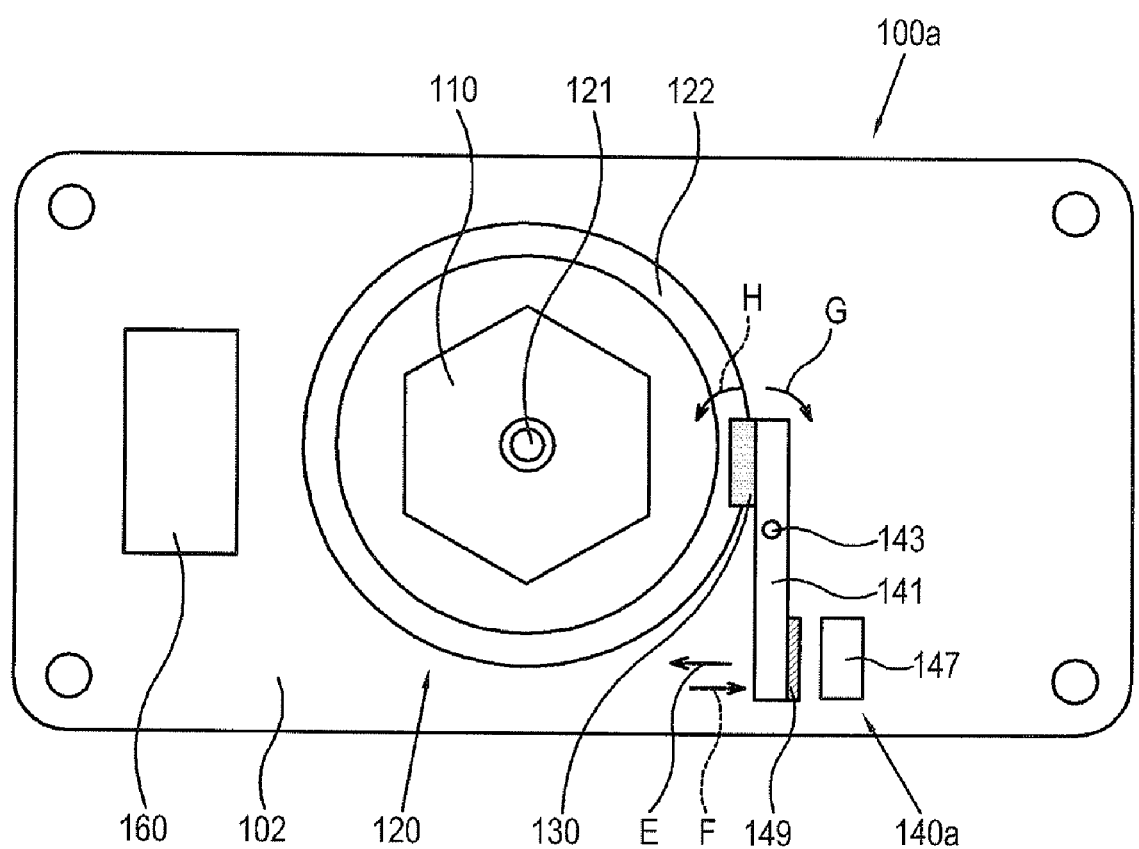
FIG. 5 is a schematic plane view of a beam deflector according to another embodiment of the present general inventive concept.

As illustrated in FIG. 5, a beam deflector 100a according to another embodiment of the present general inventive concept may include a friction member driving unit 140a. Here, the beam deflector 100a may include the same configurations as the embodiment described above with respect to FIG. 1, except the friction member driving unit 140a.

Figure 6:
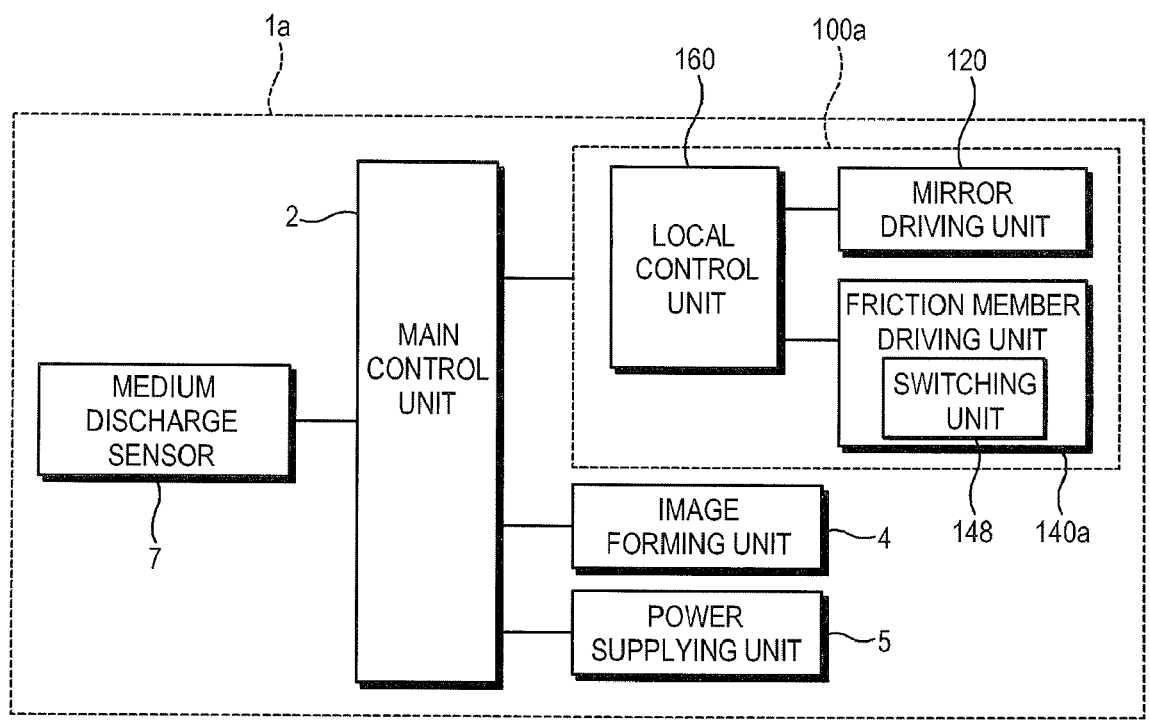
FIG. 6 is a block diagram of an image forming apparatus including the beam deflector of FIG. 5.

Here, the friction member driving unit 140a may include a lever 141 to support a friction member 130 and to rotate about a hinge pivot 143 in clockwise and counterclockwise directions, a permanent magnet 149 may be disposed on a first side of the lever 141 opposite to a second side to which the friction member 130 may be disposed with respect to the hinge pivot 143, an electromagnetic unit 147 facing the permanent magnet 149, and a switching unit 148 illustrated in FIG. 6 switching the polarity of an electric power supplied to the electromagnetic unit 147.

If receiving a rotor driving signal, a local control unit 160 illustrated in FIG. 6 may generate a repulsion E between the electromagnetic unit 147 and the permanent magnet 149 to rotate the lever 141 in a clockwise direction G. For this, the switching unit 148 may be controlled to apply a repulsion power to the electromagnetic unit 147. Accordingly, the friction member 130 may be separated from the rotor 122 so that a polygon mirror 110 can normally rotate.

On the other hand, if receiving a rotor decelerating signal, the local control unit 160 may generate an attraction F between the electromagnetic unit 147 and the permanent magnet 149 to rotate the lever 141 in a counterclockwise direction H. For this, the electromagnetic unit 147 may be applied with an attraction power reverse to the repulsion power. The switching unit 148 may be controlled to switch the electric power supplied to the electromagnetic unit 147 from the repulsion power to the attraction power.

Here, the repulsion power and the attraction power may have different intensities (i.e., absolute value). The repulsion may separate the friction member 130 from the rotor 122, and the attraction may forcedly contact the friction member 130 to the rotor 122. Accordingly, the specified intensities of the repulsion and the attraction may be different.

With reference to FIG. 6, an image forming apparatus 1a including the beam deflector 100a may include a power supplying unit 5 to generate the repulsion power and the attraction power, and to supply the power to the electromagnetic unit 147.

Figure 7:
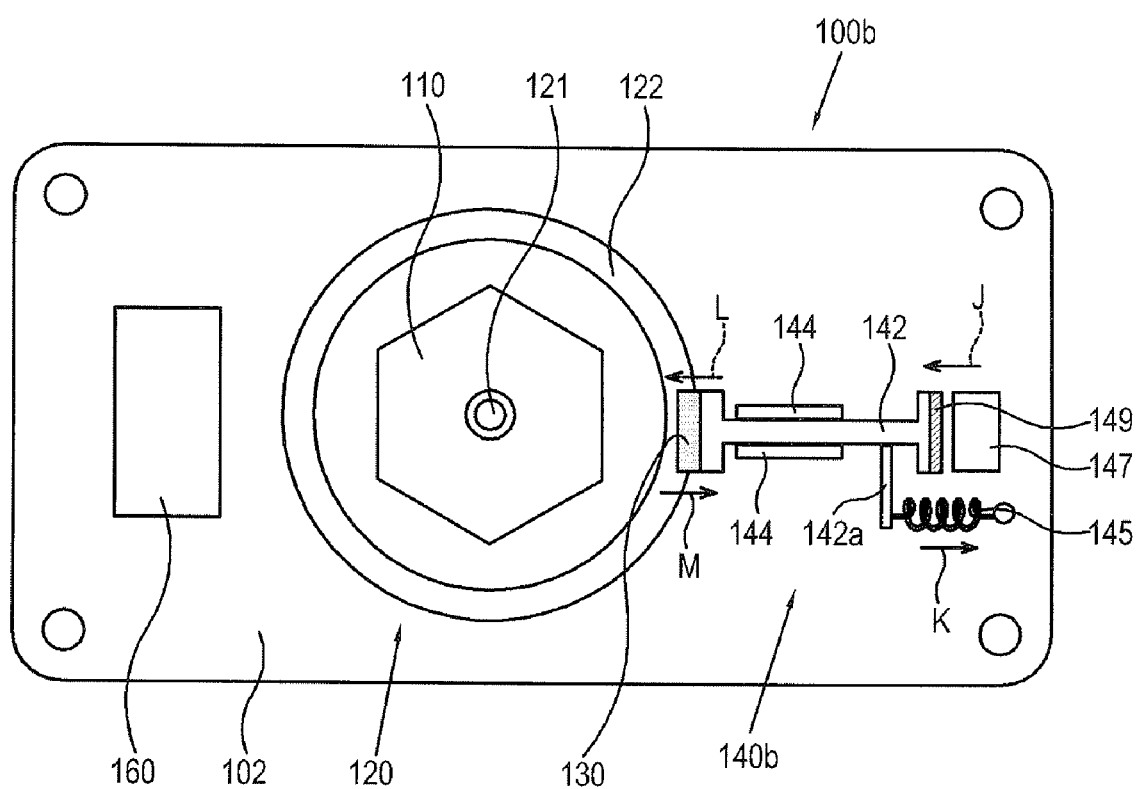
FIG. 7 is a schematic plane view of a beam deflector according to another embodiment of the present general inventive concept.

As illustrated in FIG. 7, a beam deflector 100b according to another embodiment of the present general inventive concept may include a friction member driving unit 140b.

In comparison to the beam deflector 100 described above with respect to FIG. 1, the lever 142 according to this embodiment of the present general inventive concept may be provided to rectilinearly reciprocate along a pair of guides 144. Here, the friction member driving unit 140b may include the lever 142, an elastic member 145 to elastically bias the lever 142 in a distanced direction from the rotor 122, an electromagnetic unit 147, and a permanent magnet 149.

A friction member 130 may be attached to a front end part of the lever 142, and the permanent magnet 149 may be attached to a rear end part thereof so that they can rectilinearly reciprocate together. The elastic member 145 may be coupled to an elastic coupling part 142a extending in a transverse direction with respect to a lengthwise direction of the lever 142.

If receiving a rotor driving signal, a local control unit 160 may block an electric power supplied to the electromagnetic unit 147. Accordingly, the lever 142 can retreat in the direction M by means of an elastic force K of the elastic member 145 so that friction member 130 can be separated from the rotor 122, and the rotor 122 can normally rotate to rotate a polygon mirror 110.

On the other hand, if receiving a rotor decelerating signal, the local control unit 160 may supply electric power to the electromagnetic unit 147. Accordingly, a current may be applied to a coil winding around the electromagnetic unit 147 to generate a repulsion force J between the permanent magnet 149 and the electromagnetic unit 147. Accordingly, the lever 142 may move forwardly in the direction L so that the friction member 130 can contact the rotor 122, thereby stopping the rotor 122 by means of a friction force within a rapid time, and absorbing vibration of the rotor 122 by means of an elastic transformation of the friction member 130.

As described above, the present general inventive concept may provide a beam deflector, a light scanning unit and an image forming apparatus having the same to stop a mirror driving unit driving a polygon mirror within a rapid time, thereby minimizing noise due to rotation of the polygon mirror and a rotor.

Also, the present general inventive concept provides a beam deflector, a light scanning unit and an image forming apparatus having the same to allow a friction member contacting to a rotor to be elastically transformed to absorb vibration of a polygon mirror and a rotor, thereby improving the noise removing effect. The vibrations may include sound waves.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A beam deflector, comprising:
a base;
a polygon mirror to reflect a light beam;

a mirror driving unit comprising a rotor shaft erected from the base, and a rotor to support the polygon mirror and to rotate about the rotor shaft;

a friction member to selectively contact and be separated from the rotor to obstruct and release rotation of the rotor, respectively; and a friction member driving unit to drive the friction member.

2. The beam deflector of claim 1, further comprising a control unit to control the friction member driving unit to selectively contact and separate the friction member to and from the rotor if a rotor decelerating signal and a rotor driving signal are received from an outside control source.

3. The beam deflector of claim 2, wherein the friction member driving unit comprises:

a lever to support the friction member and to move so that the friction member can contact to and be separated from the rotor, and an electromagnetic unit to drive the lever by means of a magnetic force.

4. The beam deflector of claim 3, wherein the friction member driving unit further comprises:

an elastic member to elastically bias the lever away from the rotor, wherein the lever is formed of a metallic material.

5. The beam deflector of claim 4, wherein the friction member driving unit further comprises:

a hinge pivot erected from the base, wherein the lever rotates about the hinge pivot.

6. The beam deflector of claim 3, wherein the friction member driving unit further comprises a permanent magnet coupled to the lever away from the friction member so as to cooperate with the electromagnetic unit to contact and separate the friction member to and from the rotor by means of magnetic attraction and repulsion.

7. The beam deflector of claim 6, wherein the friction member driving unit further comprises:

a switching unit to switch an electric power supplied to the electromagnetic unit from an outside power supply to change a polarity of the electromagnetic unit; and wherein the control unit controls the switching unit so that the magnetic attraction and repulsion can be generated in response to the rotor decelerating signal and the rotor driving signal.

8. A light scanning unit, comprising:

a beam deflector according to claim 1.

9. An image forming apparatus, comprising:

a light source;

an image forming unit comprising a photosensitive body to form an image on a printing medium; and a beam deflector comprising:

a base;

a polygon mirror to reflect a light beam emitted from the light source toward the photosensitive body;

a mirror driving unit comprising a rotor shaft erected from the base, and a rotor to support the polygon mirror and to rotate about the rotor shaft;

a friction member to selectively contact and be separated from the rotor to obstruct and release rotation of the rotor, respectively; and a friction member driving unit to drive the friction member.

10. The image forming apparatus of claim 9, further comprising:

a sensor to sense whether a printing operation of the image forming unit is complete; and a control unit to control the friction member driving unit so that the friction member contacts the rotor if the printing operation is complete and separates from the rotor during performance of the printing operation.

11. The image forming apparatus of claim 10, wherein the sensor comprises a medium discharge sensor to sense whether the printing medium is discharged.

12. The image forming apparatus of claim 10, wherein the friction member driving unit comprises:

a lever to support the friction member and to move so that the friction member can contact to and be separated from the rotor, and an electromagnetic unit to drive the lever by means of a magnetic force.

13. The image forming apparatus of claim 12, wherein the friction member driving unit further comprises an elastic member to elastically bias the lever away from the rotor, wherein the lever is formed of a metallic material.

14. The image forming apparatus of claim 13, wherein the friction member driving unit further comprises a hinge pivot erected from the base, wherein the lever rotates about the hinge pivot.

15. The image forming apparatus of claim 12, wherein the friction member driving unit further comprises:

a permanent magnet coupled to the lever away from the friction member so as to cooperate with the electromagnetic unit to contact and separate the friction member to and from the rotor by means of magnetic attraction and repulsion.

16. The image forming apparatus of claim 15, further comprising:

a power supplying unit to supply an electric power to the electromagnetic unit;

wherein the friction member driving unit further comprises a switching unit to switch the electric power supplied to the electromagnetic unit to change a polarity of the electromagnetic unit; and wherein the control unit controls the switching unit so that the magnetic attraction and repulsion can be respectively generated based on whether the printing operation is complete.

17. An image forming apparatus to perform a printing operation, the image forming apparatus comprising:

a light source to emit a light beam;

a polygon mirror to reflect the light beam to a photosensitive body;

a rotor to rotate the polygon mirror; and a friction member to contact the rotor to obstruct rotation of the rotor when the printing operation is complete, and to separate from the rotor during performance of the printing operation.

18. The image forming apparatus of claim 17, wherein the friction member contacts the rotor only after the last medium of a plurality of mediums has been printed thereon.

19. The image forming apparatus of claim 17, wherein the friction member absorbs vibrations from the rotor when the friction member contacts the rotor.

20. A beam deflector, comprising:

a polygon mirror to reflect a light beam;

a mirror driving unit comprising a rotor shaft disposed through a central opening of the polygon mirror and a rotor to rotate the polygon mirror with respect to the rotor shaft; and a friction member to selectively contact or separate from the rotor to obstruct and release rotation of the rotor.

* * * * *